United States Patent [19]

Swartzendruber

[11] Patent Number: 4,667,623

[45] Date of Patent: May 26, 1987

[54] INTAKE CUP APPARATUS

[75] Inventor: Ray E. Swartzendruber, Syracuse, Ind.

[73] Assignee: Chore-Time Equipment, Inc., Milford, Ind.

[21] Appl. No.: 829,705

[22] Filed: Feb. 12, 1986

[51] Int. Cl.⁴ .......................................... A01K 39/012
[52] U.S. Cl. ............................................... 119/52 AF
[58] Field of Search ..................................... 119/52 AF

[56] References Cited

U.S. PATENT DOCUMENTS

| | | | |
|---|---|---|---|
| 2,646,023 | 7/1953 | Virgil | 119/52 AF |
| 2,794,421 | 6/1957 | Rose et al. | 119/52 AF |
| 4,060,055 | 11/1977 | Skinner | 119/48 |
| 4,495,894 | 1/1985 | Swartzendruber | 119/51 R |

Primary Examiner—Hugh R. Chamblee
Attorney, Agent, or Firm—Trexler, Bushnell, Giangiorgi & Blackstone, Ltd.

[57] ABSTRACT

An intake cup apparatus is provided for delivering feed from a drop tube to a rotating auger-like conveyor. The apparatus comprises a housing extending above and around the auger-like member and having a top inlet portion for connection to the drop tube for receiving feed therefrom; and a feed metering gate structure mounted interiorly of the housing for directing and controlling the rate of flow of the feed to the auger-like conveyor. This gate structure comprises a pair of generally parallel plates spaced apart by a dimension similar to the diameter of the auger-like conveyor and having lower edges thereof extending about the auger-like conveyor. These plates are vertically movable relative to the auger-like member to thereby control the flow rate of feed thereto. The lower edges of the plates are respectively vetically offset such that the relative lower one of the edges is disposed in the direction of auger rotation relative to the other plate so as to facilitate the maintenance of a substantially level distribution of feed across the conveyor without regard for the auger rotation.

14 Claims, 8 Drawing Figures

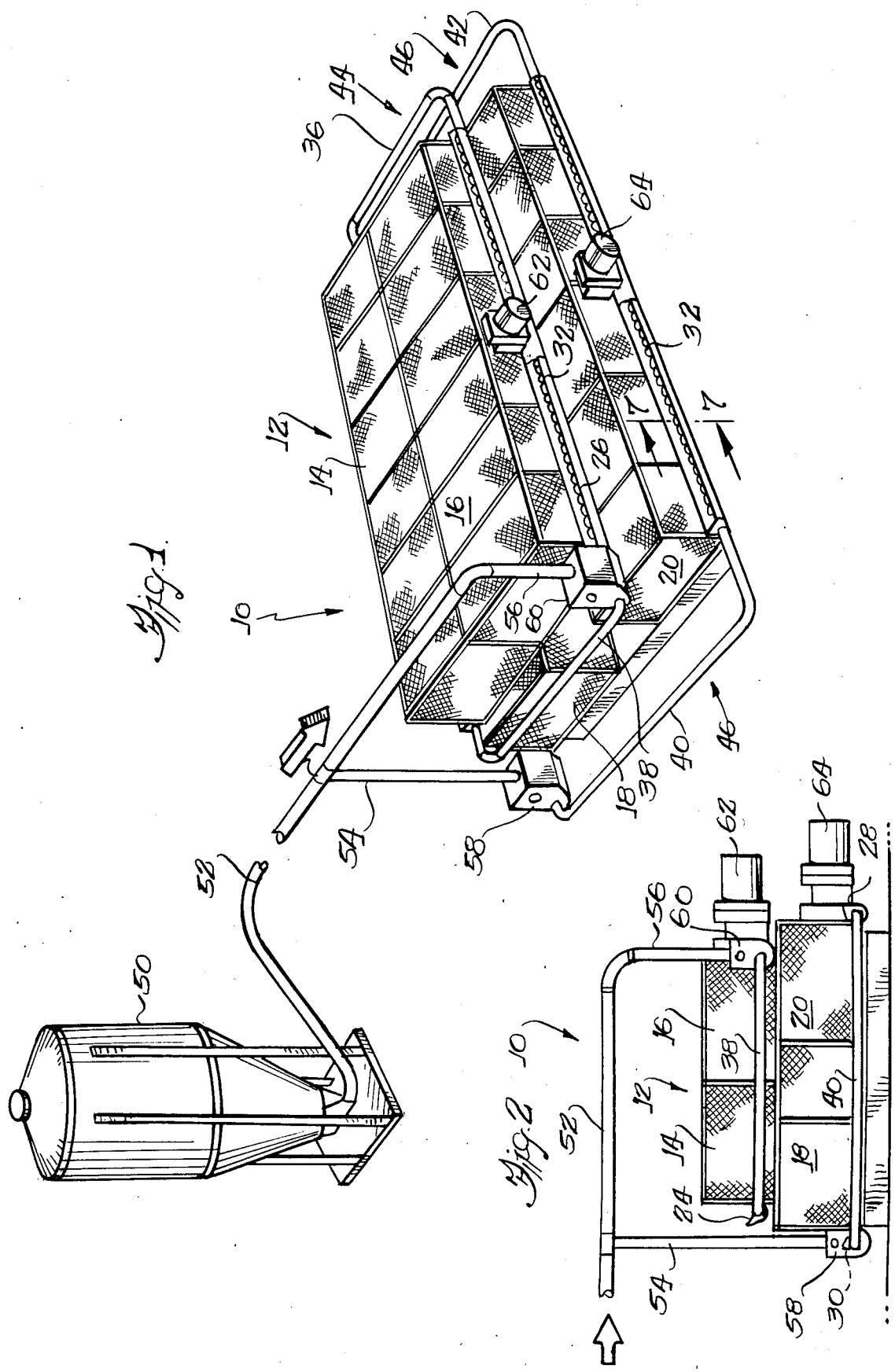

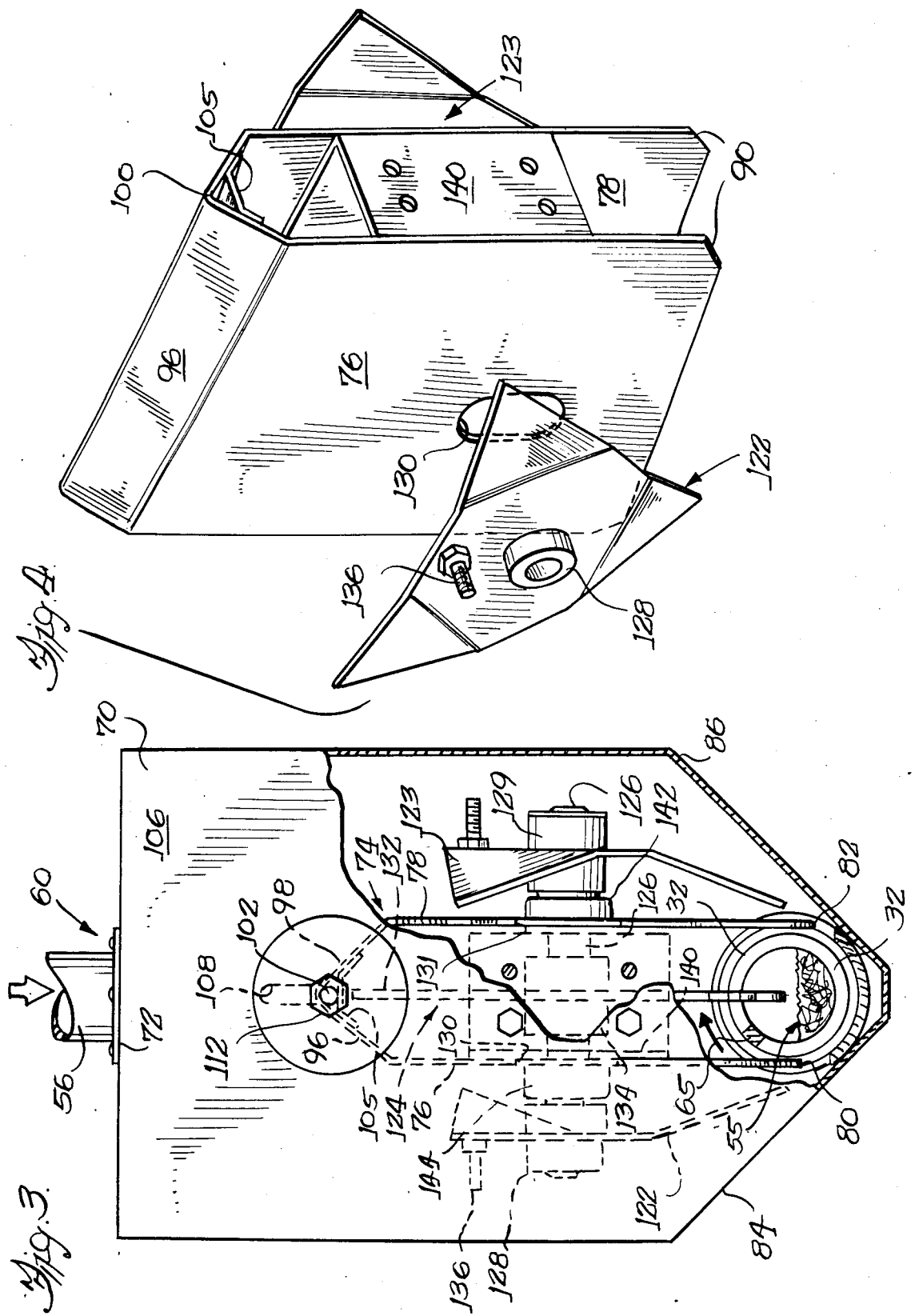

INTAKE CUP APPARATUS

This invention is directed generally to the livestock feeding apparatus art and more particularly to an improved intake cup apparatus for controlling the flow of feed from an overhead drop tube to a moving conveyor therebelow.

Large-scale poultry operations require extensive mechanization and automation to maintain large flocks of poultry in relatively large poultry houses. In egg producing or layer operations, the birds are normally individually confined in cages so that food and water can be delivered economically both at desired intervals of time and in accurately rationed amounts. Hence, the cages are also preferably constructed and arranged to facilitate automated feeding, preferably by feed delivery equipment which travels generally linearly along linearly arrayed rows of cages.

One particularly advantageous cage arrangement comprising a plurality of linearly arranged rows of cages stacked in a stepped-back or pyramidal array, is shown in U.S. Pat. No. 4,060,055. A particularly advantageous feed delivery system for such a cage arrangement is shown in U.S. Pat. No. 4,495,894 (the '894 patent).

In the '894 patent, a feed conveyor system is disclosed having a series of feed delivery conduits and feed troughs extending past the face of each of the rows of cages. A generally helical or auger-like feed conveyor or feed delivery element extends the length of each trough and conduit for delivering feed therealong. This auger may be rotated to advance the feed. However, preferably, as also shown in the '894 patent, the auger is an elongate helical coil which has its free ends joined together to form an "endless" member and is driven axially though a series of such conduits and feed troughs, preferably comprising at least one feed trough serving each of two linear arrays of cages facing in opposite directions, to form a "loop". This latter arrangement directs the relatively flexible coil or helical element around corners, bends or the like to achieve such an "endless" conveyor arrangement or "loop". One or more complementary configured sprocket or gear-like wheels are utilized to engage and axially drive this endless helical coil member around the loop.

In the co-pending application of Van Rooijen Ser. No. 806,708 filed Dec. 9, 1985 a further improvement on the foregoing system is disclosed. In this latter application, complementary angled or tilted faces of the helical coil on the one hand and of the sprocket or gear-like drive member on the other are disclosed, such that the coil slowly rotates as it is driven in a generally axial fashion by the rotating gear or sprocket.

As indicated above, it is desired to deliver feed rations which are accurate and uniform both in quantity and quality to each poultry-containing cage. That is, each bird should receive a certain amount of each constituent of the feed mix, and the relative amounts of each constituent should not be varied excessively throughout the delivered rations. However, it is known that the heavier or more dense feed constituents tend to fall to the bottom of the conveyor or trough as the feed is advanced therealong. Additionally, birds tend to pick off the upper layers of feed from the trough, so that the feed may tend to be "picked over" by the birds at or near the upstream or delivery end of the conveyor system prior to reaching the birds downstream.

The above-referenced co-pending application presents a system in which the birds are prevented from picking over the feed until the feed has been delivered throughout the row or rows of cages serviced by a given helical member. This is done by placing the helical conveyor element within the trough itself, such that the birds are prohibited by the axial advancement of the conveyor element during feed delivery from reaching therethrough to the feed being carried thereby. Secondly, the above-mentioned rotation of the helical element during its axial advancement promotes a constant mixing of the feed during delivery to thereby maintain a relatively uniform feed mixture throughout the system.

It will be recognized that in a conveyor system of the foregoing type, further improvement can be had by assuring that a relatively constant flow or a mount of feed is delivered to the conveyor auger or helical member during advancement thereof for feed distribution around the system or loop. This will assure a uniform quantity of feed being delivered through the system or loop. Moreover, proper control of the flow characteristics of feed to the auger or helical member can also assure a relatively constant height or level of feed, both transversely across and axially along the system, relative to the trough and/or the height of the auger or helical conveyor member during delivery of feed. This is also important in order to assure that the feed will remain at a level substantially below the top of the helical conveyor member to prevent the birds from reaching the feed during delivery thereof as discussed above.

OBJECT AND SUMMARY OF THE INVENTION

Accordingly, it is a general object of the invention to provide a feed conveyor system for confined animals in which the animals are substantially prevented from consuming the feed until the feed has been delivered to all of the animals serviced by a given conveyor, and wherein the feed is maintained in a substantially uniform quantity and level throughout one or more elongate troughs served by a given conveyor. In this way, a uniform quantity and quality of feed mix is delivered to each of the consuming animals.

A related object is to provide a feed system in accordance with the foregoing object which is relatively simple and inexpensive in its manufacture and yet highly reliable in operation.

Briefly, and in accordance with the invention an intake cup apparatus is provided for delivering feed from a drop tube to a rotating auger-like conveyor. The apparatus of the invention comprises a housing extending above and around an auger-like member and having a top inlet portion for connection to the drop tube for receiving feed therefrom; and feed metering gate means mounted interiorly of said housing for directing and controlling the rate of flow of the feed to the auger-like member; wherein said gate means comprises a pair of generally parallel plates spaced apart by a dimension similar to the diameter of the auger-like member and said plates having lower edges thereof extending about said auger-like conveyor; said plates being vertically movable relative to said auger-like member to thereby control the flow rate of feed thereto.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in which like references numerals identify like elements, and in which:

FIG. 1 is a perspective view of arrayed animal cages and a feed delivery system therefor, in connection with which a conveyor system including novel feed intake cup apparatus in accordance with the invention is advantageously utilized;

FIG. 2 is a side elevation of the cages and feed delivery system of FIG. 1;

FIG. 3 is an enlarged end view, partially broken away, illustrating a feed intake cup apparatus in accordance with the invention installed in the feed conveyor system of FIGS. 1 and 2;

FIG. 4 is a perspective view of a portion of the apparatus of FIG. 3;

DETAILED DESCRIPTION OF THE ILLUSTRATED EMBODIMENT

Figure 5:
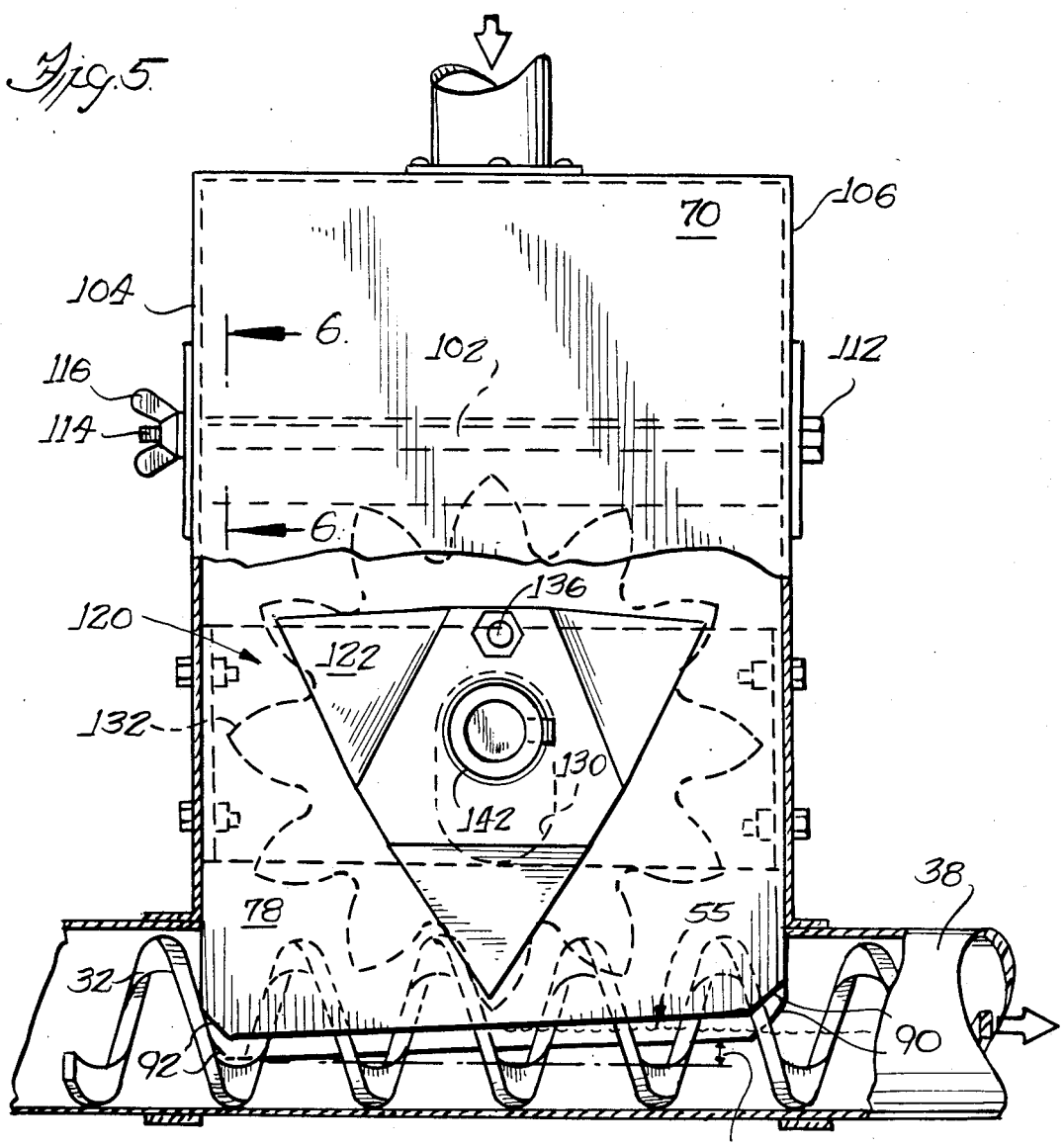
FIG. 5 is a side elevation, partially broken away, of the apparatus illustrated in FIG. 3.
Figure 6:
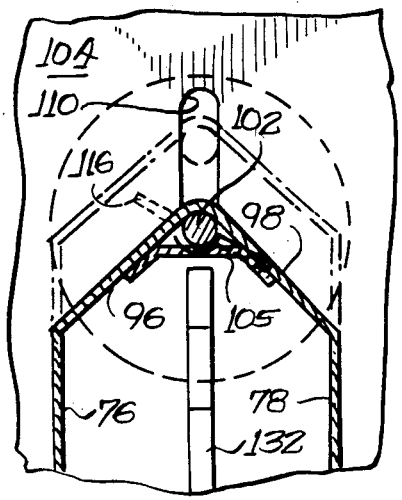
FIG. 6 is a further enlarged partial sectional view taken generally in the plane of the line 5—5 of FIG. 4.

Turning now to the drawings and initially to FIGS. 1 and 2, the apparatus of the invention is most advantageously utilized in connection with a poultry confinement and feeding system indicated generally by reference numeral 10. This system 10 utilizes an array of poultry confinement cages 12 which are arrayed in a linear fashion in generally oppositely facing, pyramidal or stepped-back multi-level configuration, in accordance with U.S. Pat. No. 4,060,055. It is contemplated, however, that the invention may be utilized with other cage constructions and arrangements as well.

In the illustrated embodiment, a pair of back-to-back upper rows of cages 14 and 16 face in opposite directions, and similarly, a pair of back-to-back lower rows of cages 18 and 20 face in opposite directions. However, the lower rows 18 and 20 will be seen to be spaced apart somewhat at their backs to form a generally pyramid-like or stepped-back arrangement with the rows 14 and 16 thereabove. Adjacent the faces of each of these rows of cages 14, 16, 18, 20 is a corresponding, elongated, open-top trough 24, 26, 28 and 30.

Within these troughs are disposed helical or auger-like feed delivery elements such as elements 32 and 34 which are somewhat diagramatically illustrated in FIG. 1. Moreover, troughs 24, 26 on the upper level, and troughs 28, 30 on the lower level are preferably respectively interconnected to form upper and lower endless feed conduits or loops 44, 46 by respective end connector conduit members 36, 38, and 40, 42. Accordingly, the feed delivery elements 32 and 34 preferably comprise continuous, "endless" members which extend around each of the feed conduit loops 44, 46 formed by each of the respective sets of troughs and interconnecting end conduits. Feed may be delivered to these two endless feed delivery loops from a feed storage hopper or container 50 by way of a main feed delivery conduit or header 52. This main feed delivery conduit 52 feeds a pair of delivery drop tubes 54, 56 which in turn feed the respective upper and lower feed conduit loops 44 and 46 by way of respective drop boxes or intake cup apparatus 56 and 58.

In accordance with the invention, these intake cups or drop boxes 58 and 60 are designed to correctly meter the feed received from the header 52 by way of drop tubes 54 and 56 to assure that a desired level of feed is maintained in the associated troughs. This desired level of feed is indicated for example by reference numeral 55 in FIGS. 3 and 5. As generally indicated in FIGS. 1 and 2 and as shown in further detail in FIGS. 3 and 5, the respective conveyor members or augers 32 and 34 extend through these drop boxes 58 and 60 to receive the metered feed therefrom. Briefly, each of these endless feed delivery members or augers 32 and 34 comprises a helical, coil-like member, as best viewed in FIG. 5, which is driven by a drive unit or assembly 62, 64, as shown diagramatically in FIGS. 1 and 2.

In accordance with the preferred embodiment, the augers or helical members 32 and 34 are simultaneously driven in a generally axial direction along the tubes or conveyors and rotated in the direction indicated by arrow 65 in FIG. 3. Preferably, the rate of rotation is relatively slow in relation to the rate of axial advancement of each auger or helical member, so as to slowly mix or agitate the feed as it is carried along the conveyor system. This assures that a relatively constant mix of feed is maintained throughout the system during delivery thereof. Further details of the auger conveyor system and the drive arrangement therefor are shown in the above-mentioned co-pending application of Van Rooijen to which reference is invited.

Referring now to FIGS. 3 through 6, additional details of the novel drop box or intake cup apparatus in accordance with the invention will next be described. This intake cup or drop box apparatus includes a housing 70 which extends above and around the auger 32 at the portion thereof which extends through the housing 70. More particularly, external housing walls 84, 86 converge about and beneath auger 32, which alone extends through housing 70, the conveyor tube 40 terminating as it enters the housing. A top inlet portion 72 of housing 70 is provided for connection to the drop tube 56 to receive feed therefrom. Feed is directed to the auger 32 at a controlled rate by a novel gate means or gate structure in accordance with the invention, which is designated generally by the reference numeral 74.

Advantageously, the gate means 74 comprises a pair of generally parallel plates or plate-like members 76 and 78 which are spaced apart by a dimension similar to the diameter or transverse dimension of the conveyor tube 38. Respective lower or free bottom edges 80 and 82 of these two plates extend to either side of the auger or helical conveyor member 32. The plates 76 and 78 are respectively vertically movable relative to the auger 32 so as to generally adjust the height of bottom edges 80 and 82 relative thereto. It will be seen that such adjustment, as best viewed in FIG. 3, will serve to control the relative amount of opening between these respective edges 80, 82 and the inside surfaces of housing walls 84, 86 so as to thereby control the flow rate of feed to auger 32. The adjustment means or structure for accomplishing this height adjustment will be described later herein.

That is, convergent walls 84, 86 in effect define a surface which is aligned with the bottom part of the incoming conveyor tube to receive and guide the auger therethrough. Hence, the plates 76 and 78 are vertically adjustable so as to adjust the size of a gap or opening defined between the bottom edges threof and the facing inner surfaces of the converging wall portions of the housing to thereby control the rate of feed delivery through this gap or opening to the auger or helical member.

In accordance with an important feature of the invention, and as best viewed in FIGS. 3, 4 and 5, the lower edges 80 and 82 of the plates 76 and 80 are respectively vertically offset relative to the conveyor 38. More particularly, the vertical offset of these edges 80, 82 is such that the relatively lower edge 82 is disposed or located in the direction 65 of auger rotation relative to the other edge 80. That is, as viewed in FIG. 3, the top portion of auger 32 as indicated by arrow 65 rotates in a direction generally away from plate 76 (and edge 80 thereof) and toward plate 78 (and edge 82 thereof). We have found that offsetting the edges 80, 82 of the plates in this fashion facilitates the maintaining of a substantially level distribution of feed transversely across the conveyor 38 without regard for the auger rotation. Viewed another way, this arrangement is believed to generally compensate for the effect of auger rotation upon the rate of introduction of feed on either side of the auger and hence, the uniformity of the level of feed across the conveyor 38. That is, the vertical offsetting of the plates to either side of the rotating auger 32 helps to equalize the amount of feed entering the auger conveyor from either side.

In accordance with a further feature of the invention, the plate edges 80 and 82, as best viewed in FIGS. 4 and 5, are further inclined along their length at a predetermined angle. That is the edges 80, 82 lie in a parallel orientation with each other, but are inclined or oriented at some given, predetermined angle relative to the axis of the auger 32. It is believed that this angle of inclination serves to maintain the desired relatively uniform level of feed in the conveyor in the axial direction, as the auger or helical member 32 moves through the housing 70 and between the plates 76 and 78. Hence, the angle of inclination of the plate lower edges is oriented, as best viewed in FIG. 5, to present a gradually increasing effective height of the lower edges relative to the conveyor in the direction of movement of feed therein by the auger 32. This predetermined angle is indicated in FIG. 5 generally by the reference numeral 85. It is believed that this angling or incline of the bottom edges helps maintain a substantially uniform quantity of feed flowing out of the intake cup regardless of the quantity of recirculating feed entering from the loop.

To further facilitate the placement and orientation of plates 76 and 78 relative to the auger 32, respective leading and trailing ends of edges 82 and 84 also preferably formed in a convergent fashion. That is, the respective corners are relieved by angles or otherwise so as to generally converge, as indicated at reference numerals 90 and 92, in the downward direction.

As previously mentioned, adjustment means or structure is provided for adjusting the height of the plates 76, 78 and hence of lower edges 80, 82 relative to the facing walls 84, 86 and to auger 32 to thereby control the flow rate of feed material to the latter. In this regard, upper or topmost ends 96, 98 of the plates are angled or otherwise directed so as to converge in an upward direction and meet at a topmost portion 100. In this regard, plates 76 and 78 may be formed from a single continuous sheet of material formed, as best viewed in FIG. 4, to the configuration thus far described.

The height adjusting structure further includes an elongate rod-like member 102 which extends along the convergent topmost portion 100 and preferably is coupled thereto immediately inside thereof, such that lifting and lowering of this rod 102 will result in a corresponding lifting and lowering of the plates 76, 78. To this end, one or more short brackets 105 may be affixed intermediate converging plate ends 96 and 98 so as to positively engage shaft or rod 102 to assure upward and downward movement of plates 76 and 78 with the rod 102. That is, the rod is thereby held between the brackets 105 on the one side and the joined or convergent end surface 100 of the plates 76 and 78 on the other side.

To accomplish the height adjustment, respective outermost ends of rod 102 extend through opposite lateral walls 104, 106 of the housing 70. These opposite lateral walls are provided with a pair of vertically elongate, aligned through apertures or slots 108, 110 for receiving the rod ends and for permitting adjustment of the vertical height thereof.

Preferably, one end of elongate rod 102 is provided with an enlarged head portion 112 to abut against the outer surface of wall 106 about through aperture 108. The opposite end of the rod 102 is threaded as indicated at 114 to receive a complementary threaded, enlarged diameter fastener 116, which in the illustrated embodiment comprises a wing nut. This latter fastener or wing nut 116 preferably abuts an outer surface of wall 104 about through aperture 110 therein. Hence, the wing nut or other fastener 116 is manually advanceable and retractable in threadable engagement with threaded end 114 of rod 102 so as to alternatively lock and release the rod at a desired height relative to the elongate slots 108, 110.

In accordance with the preferred form of the invention illustrated, an agitator means or assembly designated generally by reference numeral 120 is rotatably mounted in the housing 70. This assembly 120 includes at least one agitator member 122 and a drive means or assembly designated generally by reference numeral 124 for rotating the agitator member so as to agitate the feed within the housing 70 prior to delivery thereof by the gate means or assembly 74 to the conveyor 38. In the embodiment illustrated in FIGS. 3 through 5, the agitator assembly includes a pair of similar agitator members 122 and 123 which are mounted or located in the housing 70 to either laterally outer side of the respective plates 76 and 78.

An elongate mounting shaft 126 mounts each agitator member 122, 123 at a central hub portion 128, 129 thereof. This shaft extends through a pair of aligned, vertically elongated through apertures 130, 131 provided in each of plates 76, 78, and also mounts the drive means comprising a gear wheel or sprocket member 132 between the plates. This sprocket or gear wheel member 132 extends downwardly between the two plates and into registry with the conveyor auger member 32 so as to be rotated by the auger as it rotates and/or axially advances along the conveyor. In this regard, the auger 32 may also be of the rotating type (i.e., not axially driven) without departing from the invention. This gear wheel or sprocket member also preferably has a central hub portion 134 coupled with a central portion of the shaft member 126.

Figure 7:
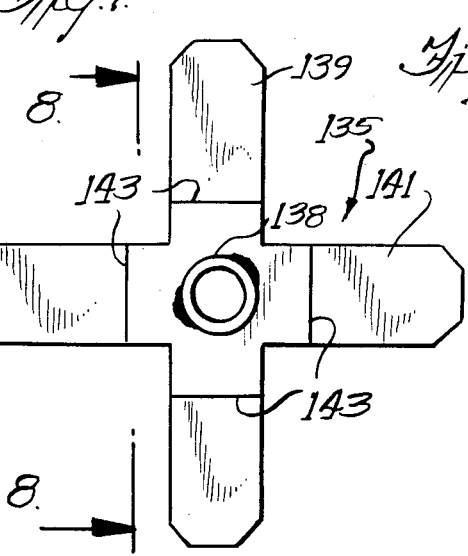
FIGS. 7 and 8 are a plan view and side elevation, respectively of an alternate form of agitator member.
Figure 8:
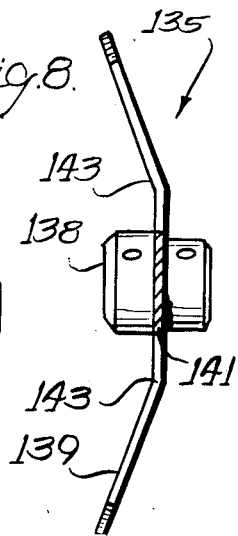

In the embodiment illustrated in FIGS. 3, 4 and 5 each of the agitator members 122, 123 comprises a generally triangular plate-like member which has the hub 128, 129 located substantially in a centered position thereupon. This plate-like member also has its three corner portions bent-over or relatively angularly oriented somewhat, and in the illustrated embodiment, angled or bent generally inwardly or in the direction of the facing one of the plates 76, 78. Additionally, one or more protruding members such as a threaded fastener 136 may be coupled to the surface of the plate-like member 122 so as to protrude therefrom to further agitate the feed as it passes through housing 70 and past the agitator member 122. Alternatively, as shown in FIGS. 7 and 8, each agitator member may comprise a cross-like member 135 having a pair of flat, elongate arms 139, 141 crossed over at a central hub portion 138 to be coupled to the shaft. Like the corners of agitators 122, 123 the arms 139, 141 are bent-over somewhat a short distance radially outwardly from the hub 138, as indicated at 143.

The entire agitator assembly may further be mounted in a fixed location relative to housing by one or more brackets 140 which are fixed to the opposite lateral walls 104 and 106 of the housing. Preferably, these brackets 140 have central through apertures through which the shaft 126 extends, and which further mount a pair of bearing members 142, 144 which provide for smooth rotation of shaft 126 and agitator members 122, 123 or 135 mounted thereto.

In order to permit vertical adjustment of the plates 76, 78 as previously described, relative to this fixed mounting of the agitator assembly, through apertures 130 are vertically elongated generally to a corresponding extent with through apertures 108 and 110 of the vertical height adjustment assembly, to permit corresponding vertical movement of the plates relative to the fixed shaft 126. That is, through apertures 130, 131 receive the bearings 142, 144 extending therethrough and slidably vertically movable therein to an extent corresponding to the amount of vertical movement of rod 102 permitted by elongate apertures 108 and 110.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An intake cup apparatus for delivering feed from a drop tube thereabove to a conveyor therebelow which includes a rotating auger-like member, said apparatus comprising: a housing extending above said conveyor and having a top inlet portion for connection to said drop tube to receive feed therefrom, said housing having a pair of external walls converging about and beneath said auger-like member; and gate means mounted interiorly of said housing for directing the flow of feed therethrough and controlling the flow rate of feed to the conveyor; wherein said gate means comprises a pair of plates which converge at a topmost portion thereof to direct feed from said inlet therearound and extending downwardly to form a pair of parallel surfaces spaced apart by a dimension similar to the diameter of said auger-like member, lower edges of said plates extending to either side of said auger-like member; adjustment means for adjusting the height of said plates relative to said convergent walls of said housing to thereby control the flow rate of feed to said auger-like member; and wherein said lower edges of said plates are respectively vertically offset, the plate with the lower edge being located in the direction of rotation of said auger-like member relative to the other of said plates so as to distribute feed substantially evenly transversely across said conveyor, substantially without regard for the rotation of said auger.

2. Apparatus according to claim 1 wherein both of said plate lower edges are further inclined at a predetermined angle, so as to lie in substantially parallel alignment with each other; said predetermined angle of inclination thereof being oriented to present a gradually increasing effective height of both of said lower edges relative to said convergent housing walls in the direction of movement of feed by said auger-like member.

3. Apparatus according to claim 1 wherein respective leading and trailing ends of each of said plate bottom edges converge in the direction of said conveyor to facilitate initial placement and alignment of said bottom edges with respect to said conveyor.

4. Apparatus according to claim 1 wherein said external walls of said housing include opposed lateral walls joining said converging walls, and extend vertically above the convergent topmost portion of said plates.

5. Apparatus according to claim 4 wherein said opposite lateral walls mount fittings for coupling with said conveyor and receiving said auger-like member therethrough.

6. Apparatus according to claim 4 wherein said adjustment means comprises an elongate rod extending along and joined to said converging topmost portion of said gate means plates, a vertically elongate slot formed in aligned portions of each of opposed lateral walls of said housing to either end of said plates, opposite ends of said rod being vertically slidably mounted in said slots, and releasable locking means operatively coupled with said rod for releasably locking said rod at any desired vertical position relative to said elongate slots.

7. Apparatus according to claim 6 wherein said releasable locking means comprises an enlarged head portion at one end of said elongate rod abutting an outer surface of one of said lateral walls about the elongate slot therein and an opposite threaded end thereof, and a mating threaded fastener for engaging said threaded end so as to abut against an opposite one of said lateral walls about the elongate slot therein, said threaded fastener being manually advanceable and retractable so as to alternatively lock and release said rod at a desired height relative to said elongate slots.

8. Apparatus according to claim 1 and further including agitating means including at least one agitator member rotatably mounted in said housing and drive means coupled for rotating said agitator member so as to agitate said feed prior to delivery by said gate means to said conveyor.

9. Apparatus according to claim 4 wherein said drive means comprises a gear wheel member rotatably mounted intermediate said plates and extending into registry with said auger-like member to be rotated thereby.

10. Apparatus according to claim 9 wherein said agitator means comprises at least one generally triangular plate-like member having bent-over corner portions and coupled substantially at its center to rotate in unison with said gear wheel member.

11. Apparatus according to claim 9 wherein said agitator means comprises at least one generally annular wheel-like member having a central hub portion and a plurality of agitator spokes extending radially outwardly from said hub; said hub being coupled to rotate in unison with said gear wheel member.

12. Apparatus according to claim 9 wherein each of said plates has a through opening, and wherein said agitating means includes an elongate shaft extending through and between said through openings and laterally outwardly to either side thereof, said elongate shaft mounting said gear wheel means at a central portion thereof and one said agitator member at either end thereof, laterally outwardly of the respective plates.

13. An intake apparatus for delivering feed to a conveyor which comprises a cylindrical tube having an auger-like member rotating therein, comprising: a housing extending above and converging upon said conveyor and having an inlet for receiving feed; gate means mounted in said housing for directing the flow of feed therethrough and controlling the flow rate of feed to the conveyor; said gate means comprising a pair of plates which are disposed to direct feed to either side thereof and to said auger-like member, said cylindrical tube terminating to either end of said housing; lower edges of said plates extending to either side of said auger-like member; and means for adjusting the height of said lower edges of said plates relative to said auger-like member to control the flow rate of feed thereto; wherein said plate lower edges are inclined at a predetermined angle so as to present a gradually increasing effective height of both of said lower edges relative to said conveyor in the direction of movement of feed therein.

14. Apparatus according to claim 13 wherein said lower edges of said plates are respectively vertically offset, the plate with the lowermost edge relative to said auger-like member being located in the direction of rotation thereof relative to the other of said plates so as to substantially equalize the amount of feed entering said conveyor from either side.

* * * * *